United States Patent
Nakano et al.

(10) Patent No.: US 11,572,610 B2
(45) Date of Patent: *Feb. 7, 2023

(54) STEEL SHEET

(71) Applicant: NIPPON STEEL & SUMITOMO METAL CORPORATION, Tokyo (JP)

(72) Inventors: Katsuya Nakano, Tokyo (JP); Kunio Hayashi, Tokyo (JP); Yuri Toda, Tokyo (JP); Eisaku Sakurada, Tokyo (JP); Akihiro Uenishi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 288 days.

This patent is subject to a terminal disclaimer.

(21) Appl. No.: 16/335,446

(22) PCT Filed: Jan. 25, 2017

(86) PCT No.: PCT/JP2017/002472
§ 371 (c)(1),
(2) Date: Mar. 21, 2019

(87) PCT Pub. No.: WO2018/138791
PCT Pub. Date: Aug. 2, 2018

(65) Prior Publication Data
US 2020/0040435 A1 Feb. 6, 2020

(51) Int. Cl.
| | |
|---|---|
| *C21D 9/46* | (2006.01) |
| *C22C 38/40* | (2006.01) |
| *B32B 15/01* | (2006.01) |
| *C21D 6/00* | (2006.01) |
| *C21D 8/02* | (2006.01) |
| *C22C 38/02* | (2006.01) |
| *C22C 38/00* | (2006.01) |
| *C22C 38/04* | (2006.01) |
| *C22C 38/06* | (2006.01) |
| *C22C 38/20* | (2006.01) |
| *C22C 38/22* | (2006.01) |
| *C22C 38/24* | (2006.01) |
| *C22C 38/26* | (2006.01) |
| *C22C 38/28* | (2006.01) |
| *C22C 38/32* | (2006.01) |
| *C23C 2/02* | (2006.01) |
| *C23C 2/06* | (2006.01) |
| *C23C 2/40* | (2006.01) |

(52) U.S. Cl.
CPC ............ *C22C 38/40* (2013.01); *B32B 15/013* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 9/46* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C23C 2/02* (2013.01); *C23C 2/06* (2013.01); *C23C 2/40* (2013.01); *C21D 2211/001* (2013.01); *C21D 2211/002* (2013.01); *C21D 2211/005* (2013.01); *C21D 2211/008* (2013.01); *C21D 2211/009* (2013.01)

(58) Field of Classification Search
CPC ....................................................... C21D 9/46
See application file for complete search history.

(56) References Cited

U.S. PATENT DOCUMENTS

| | | | |
|---|---|---|---|
| 4,159,218 A | 6/1979 | Chatfield et al. | |
| 4,285,741 A | 8/1981 | Furukawa et al. | |
| 6,554,918 B2 * | 4/2003 | Kashima | C21D 8/0226 |
| | | | 148/320 |
| 9,694,561 B2 * | 7/2017 | Kawata | C22C 38/06 |
| 10,113,223 B2 * | 10/2018 | Kawata | C23C 2/06 |
| 10,280,475 B2 | 5/2019 | Nonaka et al. | |
| 10,895,002 B2 * | 1/2021 | Nakano | B32B 15/01 |
| 2010/0000633 A1 * | 1/2010 | Yokoi | C23C 2/02 |
| | | | 148/504 |
| 2013/0273392 A1 | 10/2013 | Nonaka et al. | |
| 2014/0230973 A1 | 8/2014 | Fukumoto et al. | |
| 2019/0211412 A1 | 7/2019 | Nonaka et al. | |

(Continued)

FOREIGN PATENT DOCUMENTS

| | | |
|---|---|---|
| CN | 103261465 A | 8/2013 |
| JP | 54-163719 A | 12/1979 |
| JP | 6-57375 A | 3/1994 |
| JP | 7-11383 A | 1/1995 |

(Continued)

OTHER PUBLICATIONS

"Arbitrary, adj. and n." OED Online, Oxford University Press, Mar. 2021, www.oed.com/view/Entry/10180. Accessed Apr. 26, 2021. (Year: 2021).*

(Continued)

*Primary Examiner* — Jophy S. Koshy
(74) *Attorney, Agent, or Firm* — Birch, Stewart, Kolasch & Birch, LLP

(57) ABSTRACT

A steel sheet includes a predetermined chemical composition and a metal structure represented by, in area fraction, ferrite: 50% to 95%, granular bainite: 5% to 48%, martensite: 2% to 30%, and upper bainite, lower bainite, tempered martensite, retained austenite, and pearlite: 5% or less in total.

8 Claims, No Drawings

(56) References Cited

U.S. PATENT DOCUMENTS

2021/0040588 A1* 2/2021 Toda ............... C22C 38/24

FOREIGN PATENT DOCUMENTS

| | | | |
|---|---|---|---|
| JP | 7-207413 A | 8/1995 | |
| JP | 2007-70648 A | 3/2007 | |
| JP | 2007-70649 A | 3/2007 | |
| JP | 2007-70659 A | 3/2007 | |
| JP | 2007-70661 A | 3/2007 | |
| JP | 2015-78398 A | 4/2015 | |
| KR | 10-2012-0087498 A | 8/2012 | |
| KR | 10-2013-0111585 A | 10/2013 | |
| KR | 10-2015-0074968 A | 7/2015 | |
| WO | WO-2013018723 A1 * | 2/2013 | ............ C22C 38/58 |
| WO | WO 2013/051714 A1 | 4/2013 | |

OTHER PUBLICATIONS

International Search Report for PCT/JP2017/002472 dated Apr. 25, 2017.

Kitajima et al., "Characterization methods of complex ferritic microstructures using Electron Channeling Contrast Image", CAMP-ISIJ, 2013, vol. 26, p. 896, total 2 pages.

Written Opinion of the International Searching Authority for PCT/JP2017/002472 (PCT/ISA/237) dated Apr. 25, 2017.

Extended European Search Report for corresponding European Application No. 17894311.4, dated Jan. 31, 2020.

International Preliminary Report on Patentability and English translation of the Written Opinion of the International Searching Authority for International Application No. PCT/JP2017/002472, dated Aug. 8, 2019.

* cited by examiner

STEEL SHEET

TECHNICAL FIELD

The present invention relates to a steel sheet suitable for automotive parts.

BACKGROUND ART

In order to suppress the emission of carbon dioxide gas from an automobile, a reduction in weight of an automotive vehicle body using a high-strength steel sheet has been in progress. Further, in order also to secure the safety of a passenger, the high-strength steel sheet has come to be often used for the vehicle body. In order to promote a further reduction in weight of the vehicle body, a further improvement in strength is important. On the other hand, some parts of the vehicle body are required to have excellent formability. For example, a high-strength steel sheet for framework system parts is required to have excellent elongation and hole expandability.

However, it is difficult to achieve both the improvement in strength and the improvement in formability. There have been proposed techniques aiming at the achievement of both the improvement in strength and the improvement in formability (Patent Literatures 1 to 3), but even these fail to obtain sufficient properties.

CITATION LIST

Patent Literature

Patent Literature 1: Japanese Laid-open Patent Publication No. 7-11383
Patent Literature 2: Japanese Laid-open Patent Publication No. 6-57375
Patent Literature 3: Japanese Laid-open Patent Publication No. 7-207413

SUMMARY OF INVENTION

Technical Problem

An object of the present invention is to provide a steel sheet having a high strength and capable of obtaining excellent elongation and hole expandability.

Solution to Problem

The present inventors conducted earnest examinations in order to solve the above-described problems. As a result, they found out that it is important to contain, in area fraction, 5% or more of granular bainite in a metal structure in addition to ferrite and martensite and to set the total of area fractions of upper bainite, lower bainite, tempered martensite, retained austenite, and pearlite to 5% or less. The upper bainite and the lower bainite are mainly composed of bainitic ferrite whose dislocation density is high and hard cementite, and thus are inferior in elongation. On the other hand, the granular bainite is mainly composed of bainitic ferrite whose dislocation density is low and hardly contains hard cementite, and thus is harder than ferrite and softer than upper bainite and lower bainite. Thus, the granular bainite exhibits more excellent elongation than the upper bainite and the lower bainite. The granular bainite is harder than ferrite and softer than martensite, to thus suppress that voids occur from an interface between ferrite and martensite at the time of hole expanding.

The inventor of the present application further conducted earnest examinations repeatedly based on such findings, and then conceived the following various aspects of the invention consequently.

(1)
A steel sheet includes:
a chemical composition represented by, in mass %,
C: 0.05% to 0.1%,
P: 0.04% or less,
S: 0.01% or less,
N: 0.01% or less,
O: 0.006% or less,
Si and Al: 0.20% to 2.50% in total,
Mn and Cr: 1.0% to 3.0% in total,
Mo: 0.00% to 1.00%,
Ni: 0.00% to 1.00%,
Cu: 0.00% to 1.00%,
Nb: 0.000% to 0.30%,
Ti: 0.000% to 0.30%,
V: 0.000% to 0.50%,
B: 0.0000% to 0.01%,
Ca: 0.0000% to 0.04%,
Mg: 0.0000% to 0.04%,
REM: 0.0000% to 0.04%, and
the balance: Fe and impurities; and
a metal structure represented by, in area fraction,
ferrite: 50% to 95%,
granular bainite: 5% to 48%,
martensite: 2% to 30%, and
upper bainite, lower bainite, tempered martensite, retained austenite, and pearlite: 5% or less in total.

(2)
The steel sheet according to (1), in which
in the chemical composition,
Mo: 0.01% to 1.00%,
Ni: 0.05% to 1.00%, or
Cu: 0.05% to 1.00%,
or an arbitrary combination of the above is established.

(3) The steel sheet according to (1) or (2), in which
in the chemical composition,
Nb: 0.005% to 0.30%,
Ti: 0.005% to 0.30%, or
V: 0.005% to 0.50%,
or an arbitrary combination of the above is established.

(4) The steel sheet according to any one of (1) to (3), in which
in the chemical composition,
B: 0.0001% to 0.01% is established.

(5)
The steel sheet according to any one of (1) to (4), in which
in the chemical composition,
Ca: 0.0005% to 0.04%,
Mg: 0.0005% to 0.04%, or
REM: 0.0005% to 0.04%,
or an arbitrary combination of the above is established.

(6)
The steel sheet according to any one of (1) to (5), further includes:
a hot-dip galvanizing layer on a surface thereof.

(7)

The steel sheet according to any one of (1) to (5), further includes:

an alloyed hot-dip galvanizing layer on a surface thereof.

Advantageous Effects of Invention

According to the present invention, granular bainite, and the like are contained in a metal structure with appropriate area fractions, so that it is possible to obtain a high strength and excellent elongation and hole expandability.

DESCRIPTION OF EMBODIMENTS

There will be explained an embodiment of the present invention below.

First, there will be explained a metal structure of a steel sheet according to the embodiment of the present invention. Although details will be described later, the steel sheet according to the embodiment of the present invention is manufactured by undergoing hot rolling, cold rolling, annealing, and so on of a steel. Thus, the metal structure of the steel sheet is one in which not only properties of the steel sheet but also phase transformations by these treatments and so on are considered. The steel sheet according to this embodiment includes a metal structure represented by, in area fraction, ferrite: 50% to 95%, granular bainite: 5% to 48%, martensite: 2% to 30%, and upper bainite, lower bainite, tempered martensite, retained austenite, and pearlite: 5% or less in total.

(Ferrite: 50% to 95%)

Ferrite is a soft structure, and thus is deformed easily and contributes to an improvement in elongation. Ferrite contributes also to a phase transformation to granular bainite from austenite. When the area fraction of the ferrite is less than 50%, it is impossible to obtain sufficient granular bainite. Thus, the area fraction of the ferrite is set to 50% or more and preferably set to 60% or more. On the other hand, when the area fraction of the ferrite is greater than 95%, it is impossible to obtain a sufficient tensile strength. Thus, the area fraction of the ferrite is set to 95% or less and preferably set to 90% or less.

(Granular Bainite: 5% to 48%)

Granular bainite is mainly composed of bainitic ferrite whose dislocation density is as low as the order of about $10^{13}$ m/m$^3$ and hardly contains hard cementite, and thus is harder than ferrite and softer than upper bainite and lower bainite. Thus, the granular bainite exhibits more excellent elongation than upper bainite and lower bainite. The granular bainite is harder than ferrite and softer than martensite, and thus suppresses that voids occur from an interface between ferrite and martensite at the time of hole expanding. When the area fraction of the granular bainite is less than 5%, it is impossible to sufficiently obtain these effects. Thus, the area fraction of the granular bainite is set to 5% or more and preferably set to 10% or more. On the other hand, when the area fraction of the granular bainite is greater than 48%, the area fraction of ferrite and/or martensite goes short naturally. Thus, the area fraction of the granular bainite is set to 48% or less and preferably set to 30% or less.

(Martensite: 2% to 30%)

Martensite has a high dislocation density and is a hard structure, and thus contributes to an improvement in tensile strength. When the area fraction of the martensite is less than 2%, it is impossible to obtain a sufficient tensile strength, for example, a tensile strength of 590 MPa or more. Thus, the area fraction of the martensite is set to 2% or more and preferably set to 5% or more. On the other hand, when the area fraction of the martensite is greater than 30%, it is impossible to obtain sufficient elongation and hole expandability. Thus, the area fraction of the martensite is set to 30% or less and preferably set to 20% or less.

(Upper Bainite, Lower Bainite, Tempered Martensite, Retained Austenite, and Pearlite: 5% or Less in Total)

Upper bainite and lower bainite are composed of bainitic ferrite whose dislocation density is as high as about $1.0 \times 10^{14}$ m/m$^3$ and hard cementite mainly, and upper bainite further contains retained austenite in some cases. Tempered martensite contains hard cementite. The dislocation density of upper bainite, lower bainite, and tempered martensite is high. Therefore, upper bainite, lower bainite, and tempered martensite reduce elongation. Retained austenite is transformed into martensite by strain-induced transformation during deformation to significantly impair hole expandability. Pearlite contains hard cementite, to thus be a starting point from which voids occur at the time of hole expanding. Thus, a lower area fraction of the upper bainite, the lower bainite, the tempered martensite, the retained austenite, and the pearlite is better. When the area fraction of the upper bainite, the lower bainite, the tempered martensite, the retained austenite, and the pearlite is greater than 5% in total in particular, a decrease in elongation or hole expandability or decreases in the both are prominent. Thus, the area fraction of the upper bainite, the lower bainite, the tempered martensite, the retained austenite, and the pearlite is set to 5% or less in total. Incidentally, the area fraction of the retained austenite does not include the area fraction of retained austenite to be contained in the upper bainite.

Identifications of the ferrite, the granular bainite, the martensite, the upper bainite, the lower bainite, the tempered martensite, the retained austenite, and the pearlite and determinations of the area fractions of them can be performed by, for example, an electron back scattering diffraction (EBSD) method, an X-ray measurement, or a scanning electron microscope (SEM) observation. In the case where the SEM observation is performed, for example, a nital reagent or a LePera reagent is used to corrode a sample and a cross section parallel to a rolling direction and a thickness direction and/or a cross section vertical to the rolling direction are/is observed at 1000-fold to 50000-fold magnification. A metal structure in a region at about a ¼ thickness of the steel sheet as the depth from the surface can represent the metal structure of the steel sheet. In the case of the thickness of the steel sheet being 1.2 mm, for example, a metal structure in a region at a depth of about 0.3 mm from the surface can represent the metal structure of the steel sheet.

The area fraction of the ferrite can be determined by using an electron channeling contrast image to be obtained by the SEM observation, for example. The electron channeling contrast image expresses a crystal misorientation in a crystal grain as a contrast difference, and in the electron channeling contrast image, a portion with a uniform contrast is the ferrite. In this method, for example, a region having a ⅛ to ⅜ thickness of the steel sheet as the depth from the surface is set as an object to be observed.

The area fraction of the retained austenite can be determined by the X-ray measurement, for example. In this method, for example, a portion of the steel sheet from the surface to a ¼ thickness of the steel sheet is removed by mechanical polishing and chemical polishing, and as characteristic X-rays, MoK α rays are used. Then, from an integrated intensity ratio of diffraction peaks of (200) and (211) of a body-centered cubic lattice (bcc) phase and (200), (220), and (311) of a face-centered cubic lattice (fcc) phase, the area fraction of the retained austenite is calculated by using the following equation.

$$S\gamma=(I_{200f}+I_{220f}+I_{311f})/(I_{200b}+I_{211b})\times100$$

(S γ indicates the area fraction of the retained austenite, $I_{200f}$, $I_{220f}$, and $I_{311f}$ indicate intensities of the diffraction peaks of (200), (220), and (311) of the fcc phase respectively, and $I_{200b}$ and $I_{211b}$ indicate intensities of the diffraction peaks of (200) and (211) of the bcc phase respectively.)

The area fraction of the martensite can be determined by a field emission-scanning electron microscope (FE-SEM) observation and the X-ray measurement, for example. In this method, for example, a region having a ⅛ to ⅜ thickness of the steel sheet as the depth from the surface of the steel sheet is set as an object to be observed and a LePera reagent is used for corrosion. Since the structure that is not corroded by the LePera reagent is martensite and retained austenite, it is possible to determine the area fraction of the martensite by subtracting the area fraction S γ of the retained austenite determined by the X-ray measurement from an area fraction of a region that is not corroded by the LePera reagent. The area fraction of the martensite can also be determined by using the electron channeling contrast image to be obtained by the SEM observation, for example. In the electron channeling contrast image, a region that has a high dislocation density and has a substructure such as a block or packet in a grain is the martensite.

The upper bainite, the lower bainite, and the tempered martensite can be identified by the FE-SEM observation, for example. In this method, for example, a region having a ⅛ to ⅜ thickness of the steel sheet as the depth from the surface of the steel sheet is set as an object to be observed and a nital reagent is used for corrosion. Then, as described below, the upper bainite, the lower bainite, and the tempered martensite are identified based on the position of cementite and variants. The upper bainite contains cementite or retained austenite at an interface of lath-shaped bainitic ferrite. The lower bainite contains cementite inside the lath-shaped bainitic ferrite. The cementite contained in the lower bainite has the same variant because there is one type of crystal orientation relationship between the bainitic ferrite and the cementite. The tempered martensite contains cementite inside a martensite lath. The cementite contained in the tempered martensite has a plurality of variants because there are two or more types of crystal orientation relationship between the martensite lath and the cementite. The upper bainite, the lower bainite, and the tempered martensite can be identified based on the position of cementite and the variants as above to determine the area fractions of these.

The pearlite can be identified by an optical microscope observation, for example, to determine its area fraction. In this method, for example, a region having a ⅛ to ⅜ thickness of the steel sheet as the depth from the surface of the steel sheet is set as an object to be observed and a nital reagent is used for corrosion. The region exhibiting a dark contrast by the optical microscope observation is the pearlite.

Neither the conventional corrosion method nor the secondary electron image observation using a scanning electron microscope makes it possible to distinguish the granular bainite from ferrite. As a result of an earnest examination, the present inventors found out that the granular bainite has a tiny crystal misorientation in a grain. Thus, detecting a tiny crystal misorientation in a grain makes it possible to distinguish the granular bainite from ferrite. Here, there will be explained a concrete method of determining the area fraction of the granular bainite. In this method, a region having a ⅛ to ⅜ thickness of the steel sheet as the depth from the surface of the steel sheet is set as an object to be measured, by the EBSD method, a crystal orientation of a plurality of places (pixels) in this region is measured at 0.2-μm intervals, and a value of a GAM (grain average misorientation) is calculated from this result. In the event of this calculation, it is set that in the case where the crystal misorientation between adjacent pixels is 5° or more, a grain boundary exists between them, and the crystal misorientation between adjacent pixels is calculated in a region surrounded by this grain boundary to find an average value of the crystal misorientations. This average value is the value of GAM. In this manner, it is possible to detect the tiny crystal misorientation of the bainitic ferrite. The region with the value of GAM being 0.5° or more belongs to one of the granular bainite, the upper bainite, the lower bainite, the tempered martensite, the pearlite, and the martensite. Thus, the value obtained by subtracting the total of the area fractions of the upper bainite, the lower bainite, the tempered martensite, the pearlite, and the martensite from the area fraction of the region with the value of GAM being 0.5° or more is the area fraction of the granular bainite.

Next, there will be explained a chemical composition of the steel sheet according to the embodiment of the present invention and a slab to be used for manufacturing the steel sheet. As described above, the steel sheet according to the embodiment of the present invention is manufactured by undergoing hot rolling, cold rolling, annealing, and so on of the slab. Thus, the chemical composition of the steel sheet and the slab is one in which not only properties of the steel sheet but also these treatments are considered. In the following explanation, "%" being the unit of a content of each element contained in the steel sheet and the slab means "mass %" unless otherwise stated. The steel sheet according to this embodiment includes a chemical composition represented by, in mass %, C: 0.05% to 0.1%, P: 0.04% or less, S: 0.01% or less, N: 0.01% or less, O: 0.006% or less, Si and Al: 0.20% to 2.50% in total, Mn and Cr: 1.0% to 3.0% in total, Mo: 0.00% to 1.00%, Ni: 0.00% to 1.00%, Cu: 0.00% to 1.00%, Nb: 0.000% to 0.30%, Ti: 0.000% to 0.30%, V: 0.000% to 0.50%, B: 0.0000% to 0.01%, Ca: 0.0000% to 0.04%, Mg: 0.0000% to 0.04%, REM (rare earth metal): 0.0000% to 0.04%, and the balance: Fe and impurities. Examples of the impurities include ones contained in raw materials such as ore and scrap and ones contained in manufacturing steps.

(C: 0.05% to 0.1%)

C contributes to an improvement in tensile strength. When the C content is less than 0.05%, it is impossible to obtain a sufficient tensile strength, for example, a tensile strength of 590 MPa or more. Thus, the C content is set to 0.05% or more and preferably set to 0.06% or more. On the other hand, when the C content is greater than 0.1%, formation of ferrite is suppressed, thus failing to obtain sufficient elongation. Thus, the C content is set to 0.1% or less and preferably set to 0.09% or less.

(P: 0.04% or Less)

P is not an essential element and is contained in, for example, steel as an impurity. P reduces hole expandability, reduces toughness by being segregated to the middle of the steel sheet in the sheet thickness direction, or makes a welded portion brittle. Thus, a lower P content is better. When the P content is greater than 0.04%, in particular, the reduction in hole expandability is prominent. Thus, the P content is set to 0.04% or less, and preferably set to 0.01% or less. Reducing the P content is expensive, and when the P content is tried to be reduced down to less than 0.0001%, its cost increases significantly. Therefore, the P content may be 0.0001% or more.

(S: 0.01% or Less)

S is not an essential element, and is contained in steel as an impurity, for example. S reduces weldability, reduces manufacturability at a casting time and a hot rolling time, and reduces hole expandability by forming coarse MnS. Thus, a lower S content is better. When the S content is greater than 0.01%, in particular, the reduction in weldability, the reduction in manufacturability, and the reduction in hole expandability are prominent. Thus, the S content is set to 0.01% or less and preferably set to 0.005% or less. Reducing the S content is expensive, and when the S content is tried to be reduced down to less than 0.0001%, its cost increases significantly. Therefore, the S content may be 0.0001% or more.

(N: 0.01% or Less)

N is not an essential element, and is contained in steel as an impurity, for example. N forms coarse nitrides, and the coarse nitrides reduce bendability and hole expandability and make blowholes occur at the time of welding. Thus, a lower N content is better. When the N content is greater than 0.01%, in particular, the reduction in hole expandability and the occurrence of blowholes are prominent. Thus, the N content is set to 0.01% or less and preferably set to 0.008% or less. Reducing the N content is expensive, and when the N content is tried to be reduced down to less than 0.0005%, its cost increases significantly. Therefore, the N content may be 0.0005% or more.

(O: 0.006% or Less)

O is not an essential element, and is contained in steel as an impurity, for example. O forms coarse oxide, and the coarse oxide reduces bendability and hole expandability and makes blowholes occur at the time of welding. Thus, a lower O content is better. When the O content is greater than 0.006%, in particular, the reduction in hole expandability and the occurrence of blowholes are prominent. Thus, the O content is set to 0.006% or less and preferably set to 0.005% or less. Reducing the O content is expensive, and when the O content is tried to be reduced down to less than 0.0005%, its cost increases significantly. Therefore, the O content may be 0.0005% or more.

(Si and Al: 0.20% to 2.50% in Total)

Si and Al contribute to formation of granular bainite. The granular bainite is a structure in which a plurality of pieces of bainitic ferrite are turned into a single lump after dislocations existing on their interfaces are recovered. Therefore, when cementite exists on the interface of the bainitic ferrite, no granular bainite is formed there. Si and Al suppress formation of cementite. When the total content of Si and Al is less than 0.20%, cementite is formed excessively, failing to obtain sufficient granular bainite. Thus, the total content of Si and Al is set to 0.20% or more and preferably set to 0.30% or more. On the other hand, when the total content of Si and Al is greater than 2.50%, slab cracking is likely to occur during hot rolling. Thus, the total content of Si and Al is set to 2.50% or less and preferably set to 2.00% or less. Only one of Si and Al may be contained or both of Si and Al may be contained.

(Mn and Cr: 1.0% to 3.0% in Total)

Mn and Cr suppress ferrite transformation in the event of annealing after cold rolling or in the event of plating and contribute to an improvement in strength. When the total content of Mn and Cr is less than 1.0%, the area fraction of the ferrite becomes excessive, failing to obtain a sufficient tensile strength, for example, a tensile strength of 590 MPa or more. Thus, the total content of Mn and Cr is set to 1.0% or more and preferably set to 1.5% or more. On the other hand, when the total content of Mn and Cr is greater than 3.0%, the area fraction of the ferrite becomes too small, failing to obtain sufficient elongation. Thus, the total content of Mn and Cr is set to 3.0% or less and preferably set to 2.8% or less. Only one of Mn and Cr may be contained or both of Mn and Cr may be contained.

Mo, Ni, Cu, Nb, Ti, V, B, Ca, Mg, and REM are not an essential element, but are an arbitrary element that may be appropriately contained, up to a predetermined amount as a limit, in the steel sheet and the steel.

(Mo: 0.00% to 1.00%, Ni: 0.00% to 1.00%, Cu: 0.00% to 1.00%)

Mo, Ni, and Cu suppress ferrite transformation in the event of annealing after cold rolling or in the event of plating and contribute to an improvement in strength. Thus, Mo, Ni, or Cu, or an arbitrary combination of these may be contained. In order to obtain this effect sufficiently, preferably, the Mo content is set to 0.01% or more, the Ni content is set to 0.05% or more, and the Cu content is set to 0.05% or more. However, when the Mo content is greater than 1.00%, the Ni content is greater than 1.00%, or the Cu content is greater than 1.00%, the area fraction of the ferrite becomes too small, failing to obtain sufficient elongation. Therefore, the Mo content, the Ni content, and the Cu content are each set to 1.00% or less. That is, preferably, Mo: 0.01% to 1.00%, Ni: 0.05% to 1.00%, or Cu: 0.05% to 1.00% is satisfied, or an arbitrary combination of these is satisfied.

(Nb: 0.000% to 0.30%, Ti: 0.000% to 0.30%, V: 0.000% to 0.50%)

Nb, Ti, and V increase the area of grain boundaries of austenite by grain refining of austenite during annealing after cold rolling or the like to promote ferrite transformation. Thus, Nb, Ti, or V, or an arbitrary combination of these may be contained. In order to obtain this effect sufficiently, preferably, the Nb content is set to 0.005% or more, the Ti content is set to 0.005% or more, and the V content is set to 0.005% or more. However, when the Nb content is greater than 0.30%, the Ti content is greater than 0.30%, or the V content is greater than 0.50%, the area fraction of the ferrite becomes excessive, failing to obtain a sufficient tensile strength. Therefore, the Nb content is set to 0.30% or less, the Ti content is set to 0.30% or less, and the V content is set to 0.50% or less. That is, preferably, Nb: 0.005% to 0.30%, Ti: 0.005% to 0.30%, or V: 0.005% to 0.50% is satisfied, or an arbitrary combination of these is satisfied.

(B: 0.0000% to 0.01%)

B segregates to grain boundaries of austenite during annealing after cold rolling or the like to suppress ferrite transformation. Thus, B may be contained. In order to obtain this effect sufficiently, the B content is preferably set to 0.0001% or more. However, when the B content is greater than 0.01%, the area fraction of the ferrite becomes too small, failing to obtain sufficient elongation. Therefore, the B content is set to 0.01% or less. That is, B: 0.0001% to 0.01% is preferably established.

(Ca: 0.0000% to 0.04%, Mg: 0.0000% to 0.04%, REM: 0.0000% to 0.04%)

Ca, Mg, and REM control forms of oxide and sulfide to contribute to an improvement in hole expandability. Thus, Ca, Mg, or REM or an arbitrary combination of these may be contained. In order to obtain this effect sufficiently, preferably, the Ca content, the Mg content, and the REM content are each set to 0.0005% or more. However, when the Ca content is greater than 0.04%, the Mg content is greater than 0.04%, or the REM content is greater than 0.04%, coarse oxide is formed, failing to obtain sufficient hole expandability. Therefore, the Ca content, the Mg content, and the REM content are each set to 0.04% or less and preferably set to 0.01% or less. That is, preferably, Ca: 0.0005% to 0.04%, Mg: 0.0005% to 0.04%, or REM: 0.0005% to 0.04% is satisfied, or an arbitrary combination of these is satisfied.

REM is a generic term for 17 types of elements in total of Sc, Y, and elements belonging to the lanthanoid series, and the REM content means the total content of these elements. REM is contained in misch metal, for example, and when adding REM, for example, misch metal is added, or metal REM such as metal La or metal Ce is added in some cases.

According to this embodiment, it is possible to obtain a tensile strength of 590 MPa or more, TS×EL (tensile strength×total elongation) of 15000 MPa·% or more, and TS×λ (tensile strength×hole expansion ratio) of 25000 MPa·% or more, for example. That is, it is possible to obtain a high strength and excellent elongation and hole expandability. This steel sheet is easily formed into framework system parts of automobiles, for example, and can also ensure collision safety.

Next, there will be explained a method of manufacturing the steel sheet according to the embodiment of the present invention. In the method of manufacturing the steel sheet according to the embodiment of the present invention, hot rolling, pickling, cold rolling, and annealing of a slab having the above-described chemical composition are performed in this order.

The hot rolling is started at a temperature of 1100° C. or more and is finished at a temperature of the $Ar_3$ point or more. In the cold rolling, a reduction ratio is set to 30% or more and 80% or less. In the annealing, a retention temperature is set to the $Ac_1$ point or more and a retention time is set to 10 seconds or more, and in cooling thereafter, a cooling rate in a temperature zone of 700° C. to the Mf point is set to 0.5° C./second or more and 4° C./second or less.

When the starting temperature of the hot rolling is less than 1100° C., it is sometimes impossible to sufficiently solid-dissolve elements other than Fe in Fe. Thus, the hot rolling is started at a temperature of 1100° C. or more. The starting temperature of the hot rolling is a slab heating temperature, for example. As the slab, for example, a slab obtained by continuous casting or a slab fabricated by a thin slab caster can be used. The slab may be provided into a hot rolling facility while maintaining the slab to the temperature of 1100° C. or more after casting, or may also be provided into a hot rolling facility after the slab is cooled down to a temperature of less than 1100° C. and then is heated.

When the finishing temperature of the hot rolling is less than the $Ar_3$ point, austenite and ferrite are contained in a metal structure of a hot-rolled steel sheet, resulting in that it becomes difficult to perform treatments after the hot rolling such as cold rolling in some cases because the austenite and the ferrite are different in mechanical properties. Thus, the hot rolling is finished at a temperature of the $Ar_3$ point or more. When the hot rolling is finished at a temperature of the $Ar_3$ point or more, it is possible to relatively reduce a rolling load during the hot rolling.

The hot rolling includes rough rolling and finish rolling, and in the finish rolling, one in which a plurality of steel sheets obtained by rough rolling are joined may be rolled continuously. A coiling temperature is set to 450° C. or more and 650° C. or less.

The pickling is performed one time or two or more times. By the pickling, oxides on the surface of the hot-rolled steel sheet are removed and chemical conversion treatability and platability improve.

When the reduction ratio of the cold rolling is less than 30%, it is difficult to keep the shape of a cold-rolled steel sheet flat or it is impossible to obtain sufficient ductility in some cases. Thus, the reduction ratio of the cold rolling is set to 30% or more and preferably set to 50% or more. On the other hand, when the reduction ratio of the cold rolling is greater than 80%, a rolling load becomes large excessively or recrystallization of ferrite during annealing after cold rolling is promoted excessively in some cases. Thus, the reduction ratio of the cold rolling is set to 80% or less and preferably set to 70% or less.

In the annealing, the steel sheet is retained to a temperature of the $Ac_1$ point or more for 10 seconds or more, and thereby austenite is formed. The austenite is transformed into ferrite, granular bainite, or martensite through cooling to be performed later. When the retention temperature is less than the $Ac_1$ point or the retention time is less than 10 seconds, the austenite is not formed sufficiently. Thus, the retention temperature is set to the $Ac_1$ point or more and the retention time is set to 10 seconds or more.

It is possible to form granular bainite and martensite in a temperature zone of 700° C. to the Mf point in the cooling after the annealing. As described above, the granular bainite is a structure in which a plurality of pieces of bainitic ferrite are turned into a single lump after dislocations existing on their interfaces are recovered. It is possible to generate such a dislocation recovery in a temperature zone of 700° C. or less. However, when the cooling rate in this temperature zone is greater than 4° C./second, it is impossible to sufficiently recover the dislocations, resulting in that the area fraction of the granular bainite sometimes becomes short. Thus, the cooling rate in this temperature zone is set to 4° C./second or less. On the other hand, when the cooling rate in this temperature zone is less than 0.5° C./second, martensite is sometimes not formed sufficiently. Thus, the cooling rate in this temperature zone is set to 0.5° C./second or more.

In this manner, it is possible to manufacture the steel sheet according to the embodiment of the present invention.

On the steel sheet, a plating treatment such as an electroplating treatment or a deposition plating treatment may be performed, and further an alloying treatment may be performed after the plating treatment. On the steel sheet, surface treatments such as organic coating film forming, film laminating, organic salts/inorganic salts treatment, and non-chromium treatment may be performed.

When a hot-dip galvanizing treatment is performed on the steel sheet as the plating treatment, for example, the steel sheet is heated or cooled to a temperature that is equal to or more than a temperature 40° C. lower than the temperature of a galvanizing bath and is equal to or less than a temperature 50° C. higher than the temperature of the galvanizing bath and is passed through the galvanizing bath. By the hot-dip galvanizing treatment, a steel sheet having a hot-dip galvanizing layer provided on the surface, namely a hot-dip galvanized steel sheet is obtained. The hot-dip galvanizing layer includes a chemical composition represented by, for example, Fe: 7 mass % or more and 15 mass % or less and the balance: Zn, Al, and impurities.

When an alloying treatment is performed after the hot-dip galvanizing treatment, for example, the hot-dip galvanized steel sheet is heated to a temperature that is 460° C. or more and 600° C. or less. When this temperature is less than 460°

C., alloying sometimes becomes short. When this temperature is greater than 600° C., alloying becomes excessive and corrosion resistance deteriorates in some cases. By the alloying treatment, a steel sheet having an alloyed hot-dip galvanizing layer provided on the surface, namely, an alloyed hot-dip galvanized steel sheet is obtained.

It should be noted that the above-described embodiment merely illustrates a concrete example of implementing the present invention, and the technical scope of the present invention is not to be construed in a restrictive manner by the embodiment. That is, the present invention may be implemented in various forms without departing from the technical spirit or main features thereof.

EXAMPLE

Next, there will be explained examples of the present invention. Conditions of the examples are condition examples employed for confirming the applicability and effects of the present invention, and the present invention is not limited to these condition examples. The present invention can employ various conditions as long as the object of the present invention is achieved without departing from the spirit of the invention.

(First Test)

In a first test, slabs having chemical compositions illustrated in Table 1 to Table 4 were manufactured, these slabs were hot rolled, and hot-rolled steel sheets were obtained. Each space in Table 1 to Table 4 indicates that the content of a corresponding element is less than a detection limit, and the balance is Fe and impurities. Each underline in Table 1 to Table 4 indicates that a corresponding numerical value is out of the range of the present invention.

TABLE 1

| SYMBOL OF STEEL | CHEMICAL COMPOSITION (MASS %) | | | | | | | | | | | | | | | | |
|---|---|---|---|---|---|---|---|---|---|---|---|---|---|---|---|---|---|
| | C | Si + Al | Mn + Cr | P | S | N | O | Mo | Ni | Cu | Nb | Ti | V | B | Ca | Mg | REM |
| A | 0.02 | 0.64 | 1.9 | 0.024 | 0.007 | 0.001 | 0.005 | | | | | | | | | | |
| B | 0.06 | 0.53 | 2.4 | 0.014 | 0.005 | 0.009 | 0.006 | | | | | | | | | | |
| C | 0.07 | 0.52 | 1.9 | 0.012 | 0.002 | 0.007 | 0.003 | | | | | | | | | | |
| D | 0.09 | 0.67 | 2.1 | 0.025 | 0.006 | 0.008 | 0.001 | | | | | | | | | | |
| E | 0.15 | 0.53 | 1.9 | 0.027 | 0.001 | 0.003 | 0.002 | | | | | | | | | | |
| F | 0.06 | 0.10 | 2.1 | 0.014 | 0.008 | 0.003 | 0.003 | | | | | | | | | | |
| G | 0.07 | 0.25 | 1.8 | 0.016 | 0.002 | 0.009 | 0.001 | | | | | | | | | | |
| H | 0.06 | 1.90 | 2.0 | 0.010 | 0.003 | 0.007 | 0.005 | | | | | | | | | | |
| I | 0.07 | 2.30 | 2.4 | 0.029 | 0.002 | 0.005 | 0.006 | | | | | | | | | | |
| J | 0.06 | 2.90 | 2.5 | 0.025 | 0.009 | 0.009 | 0.002 | | | | | | | | | | |
| K | 0.07 | 0.65 | 0.1 | 0.015 | 0.008 | 0.001 | 0.003 | | | | | | | | | | |
| L | 0.06 | 0.61 | 1.3 | 0.016 | 0.001 | 0.009 | 0.005 | | | | | | | | | | |
| M | 0.07 | 0.58 | 2.1 | 0.025 | 0.005 | 0.003 | 0.004 | | | | | | | | | | |
| N | 0.06 | 0.65 | 2.8 | 0.030 | 0.002 | 0.007 | 0.006 | | | | | | | | | | |
| O | 0.06 | 0.63 | 3.2 | 0.027 | 0.002 | 0.005 | 0.004 | | | | | | | | | | |
| P | 0.07 | 0.51 | 2.3 | 0.007 | 0.005 | 0.006 | 0.001 | | | | | | | | | | |
| Q | 0.07 | 0.60 | 2.1 | 0.009 | 0.007 | 0.002 | 0.002 | | | | | | | | | | |
| R | 0.06 | 0.66 | 1.8 | 0.045 | 0.008 | 0.008 | 0.002 | | | | | | | | | | |
| S | 0.07 | 0.65 | 1.9 | 0.026 | 0.003 | 0.004 | 0.001 | | | | | | | | | | |
| T | 0.07 | 0.68 | 1.8 | 0.017 | 0.008 | 0.008 | 0.002 | | | | | | | | | | |
| U | 0.07 | 0.54 | 2.0 | 0.016 | 0.120 | 0.002 | 0.005 | | | | | | | | | | |
| V | 0.06 | 0.57 | 2.4 | 0.027 | 0.002 | 0.003 | 0.006 | | | | | | | | | | |
| W | 0.06 | 0.58 | 2.5 | 0.013 | 0.006 | 0.020 | 0.003 | | | | | | | | | | |
| X | 0.06 | 0.57 | 1.9 | 0.010 | 0.005 | 0.002 | 0.001 | | | | | | | | | | |
| Y | 0.07 | 0.65 | 2.2 | 0.017 | 0.007 | 0.006 | 0.008 | | | | | | | | | | |
| Z | 0.06 | 0.69 | 1.8 | 0.017 | 0.001 | 0.003 | 0.003 | 0.002 | | | | | | | | | |

TABLE 2

| SYMBOL OF STEEL | CHEMICAL COMPOSITION (MASS %) | | | | | | | | | | | | | | | | |
|---|---|---|---|---|---|---|---|---|---|---|---|---|---|---|---|---|---|
| | C | Si + Al | Mn + Cr | P | S | N | O | Mo | Ni | Cu | Nb | Ti | V | B | Ca | Mg | REM |
| AA | 0.07 | 0.61 | 2.4 | 0.013 | 0.001 | 0.008 | 0.003 | 0.800 | | | | | | | | | |
| BB | 0.07 | 0.70 | 1.8 | 0.017 | 0.001 | 0.005 | 0.003 | 1.500 | | | | | | | | | |
| CC | 0.06 | 0.59 | 2.0 | 0.018 | 0.003 | 0.007 | 0.005 | | 0.002 | | | | | | | | |
| DD | 0.07 | 0.58 | 2.0 | 0.013 | 0.003 | 0.004 | 0.004 | | 0.800 | | | | | | | | |
| EE | 0.07 | 0.52 | 2.0 | 0.016 | 0.006 | 0.008 | 0.003 | | 1.500 | | | | | | | | |
| FF | 0.07 | 0.71 | 2.5 | 0.024 | 0.001 | 0.006 | 0.003 | | | 0.002 | | | | | | | |
| GG | 0.06 | 0.50 | 2.3 | 0.019 | 0.003 | 0.005 | 0.004 | | | 0.800 | | | | | | | |
| HH | 0.07 | 0.55 | 2.4 | 0.023 | 0.006 | 0.008 | 0.006 | | | 1.500 | | | | | | | |
| II | 0.07 | 0.74 | 2.1 | 0.010 | 0.003 | 0.008 | 0.003 | | | | 0.001 | | | | | | |
| JJ | 0.07 | 0.54 | 2.3 | 0.014 | 0.002 | 0.007 | 0.004 | | | | 0.300 | | | | | | |
| KK | 0.07 | 0.71 | 2.4 | 0.029 | 0.001 | 0.004 | 0.003 | | | | 0.350 | | | | | | |
| LL | 0.07 | 0.66 | 2.3 | 0.012 | 0.007 | 0.005 | 0.001 | | | | | 0.001 | | | | | |
| MM | 0.07 | 0.55 | 2.2 | 0.020 | 0.006 | 0.003 | 0.001 | | | | | 0.300 | | | | | |
| NN | 0.07 | 0.74 | 2.3 | 0.016 | 0.006 | 0.007 | 0.003 | | | | | 0.350 | | | | | |
| OO | 0.07 | 0.58 | 1.9 | 0.029 | 0.008 | 0.002 | 0.002 | | | | | | 0.002 | | | | |
| PP | 0.07 | 0.52 | 2.5 | 0.016 | 0.009 | 0.004 | 0.006 | | | | | | 0.250 | | | | |
| QQ | 0.07 | 0.65 | 1.9 | 0.010 | 0.009 | 0.002 | 0.002 | | | | | | 0.550 | | | | |
| RR | 0.06 | 0.66 | 1.9 | 0.018 | 0.006 | 0.009 | 0.004 | | | | | | | 0.00008 | | | |
| SS | 0.07 | 0.55 | 1.9 | 0.025 | 0.001 | 0.008 | 0.004 | | | | | | | 0.00800 | | | |

TABLE 2-continued

| SYMBOL OF | CHEMICAL COMPOSITION (MASS %) | | | | | | | | | | | | | | | | |
|---|---|---|---|---|---|---|---|---|---|---|---|---|---|---|---|---|---|
| STEEL | C | Si + Al | Mn + Cr | P | S | N | O | Mo | Ni | Cu | Nb | Ti | V | B | Ca | Mg | REM |
| TT | 0.07 | 0.56 | 2.5 | 0.030 | 0.007 | 0.002 | 0.002 | | | | | | | 0.06000 | | | |
| UU | 0.07 | 0.54 | 2.1 | 0.010 | 0.004 | 0.003 | 0.004 | | | | | | | | 0.0006 | | |
| VV | 0.07 | 0.71 | 1.8 | 0.023 | 0.002 | 0.008 | 0.002 | | | | | | | | 0.0020 | | |
| WW | 0.07 | 0.69 | 1.8 | 0.014 | 0.001 | 0.009 | 0.001 | | | | | | | | 0.0600 | | |
| XX | 0.07 | 0.54 | 1.8 | 0.025 | 0.006 | 0.006 | 0.003 | | | | | | | | | 0.0006 | |
| YY | 0.07 | 0.72 | 2.1 | 0.028 | 0.002 | 0.008 | 0.004 | | | | | | | | | 0.0020 | |
| ZZ | 0.07 | 0.54 | 2.0 | 0.025 | 0.002 | 0.009 | 0.001 | | | | | | | | | 0.0600 | |

TABLE 3

| SYMBOL OF | CHEMICAL COMPOSITION (MASS %) | | | | | | | | | | | | | | | | |
|---|---|---|---|---|---|---|---|---|---|---|---|---|---|---|---|---|---|
| STEEL | C | Si + Al | Mn + Cr | P | S | N | O | Mo | Ni | Cu | Nb | Ti | V | B | Ca | Mg | REM |
| AAA | 0.07 | 0.59 | 2.2 | 0.027 | 0.003 | 0.009 | 0.002 | | | | | | | | | | 0.0006 |
| BBB | 0.06 | 0.56 | 1.9 | 0.030 | 0.009 | 0.004 | 0.002 | | | | | | | | | | 0.0200 |
| CCC | 0.07 | 0.53 | 2.3 | 0.028 | 0.005 | 0.001 | 0.001 | | | | | | | | | | 0.0500 |
| DDD | 0.07 | 0.66 | 2.0 | 0.019 | 0.007 | 0.001 | 0.002 | | | | | | | | | | |
| EEE | 0.07 | 0.54 | 2.3 | 0.026 | 0.001 | 0.005 | 0.001 | | | | | | | | | | |
| FFF | 0.06 | 0.65 | 2.0 | 0.011 | 0.006 | 0.007 | 0.002 | | | | | | | | | | |
| GGG | 0.07 | 0.59 | 2.5 | 0.013 | 0.003 | 0.007 | 0.005 | | | | | | | | | | |
| HHH | 0.06 | 0.68 | 2.1 | 0.020 | 0.002 | 0.002 | 0.004 | | | | | | | | | | |
| III | 0.07 | 0.58 | 2.4 | 0.013 | 0.009 | 0.009 | 0.005 | | | | | | | | | | |
| JJJ | 0.07 | 0.54 | 2.1 | 0.021 | 0.002 | 0.006 | 0.004 | | | | | | | | | | |
| KKK | 0.07 | 0.68 | 1.9 | 0.017 | 0.008 | 0.005 | 0.005 | | | | | | | | | | |
| LLL | 0.07 | 0.62 | 2.3 | 0.012 | 0.007 | 0.002 | 0.006 | | | | | | | | | | |
| MMM | 0.06 | 0.63 | 2.5 | 0.013 | 0.005 | 0.009 | 0.003 | | | | | | | | | | |
| NNN | 0.06 | 0.67 | 1.8 | 0.028 | 0.004 | 0.002 | 0.006 | | | | | | | | | | |
| OOO | 0.07 | 0.59 | 2.5 | 0.011 | 0.005 | 0.004 | 0.001 | | | | | | | | | | |
| PPP | 0.07 | 0.71 | 2.0 | 0.014 | 0.002 | 0.004 | 0.003 | | | | | | | | | | |
| QQQ | 0.07 | 0.72 | 2.1 | 0.024 | 0.005 | 0.001 | 0.004 | | | | | | | | | | |
| RRR | 0.07 | 0.51 | 2.2 | 0.023 | 0.005 | 0.002 | 0.001 | | | | | | | | | | |
| SSS | 0.07 | 0.54 | 2.3 | 0.027 | 0.002 | 0.003 | 0.006 | | | | | | | | | | |
| TTT | 006 | 0.61 | 2.2 | 0.019 | 0.002 | 0.002 | 0.002 | | | | | | | | | | |
| UUU | 0.07 | 0.61 | 2.5 | 0.010 | 0.001 | 0.003 | 0.005 | | | | | | | | | | |
| VVV | 0.07 | 0.50 | 1.8 | 0.017 | 0.006 | 0.009 | 0.005 | | | | | | | | | | |
| WWW | 0.07 | 0.64 | 2.1 | 0.011 | 0.008 | 0.002 | 0.005 | | | | | | | | | | |
| XXX | 0.07 | 0.53 | 2.3 | 0.021 | 0.001 | 0.001 | 0.002 | | | | | | | | | | |
| YYY | 0.06 | 0.64 | 2.4 | 0.014 | 0.004 | 0.004 | 0.003 | | | | | | | | | | |
| ZZZ | 0.07 | 0.71 | 2.1 | 0.011 | 0.005 | 0.004 | 0.002 | | | | | | | | | | |

TABLE 4

| SYMBOL OF | CHEMICAL COMPOSITION (MASS %) | | | | | | | | | | | | | | | | |
|---|---|---|---|---|---|---|---|---|---|---|---|---|---|---|---|---|---|
| STEEL | C | Si + Al | Mn + Cr | P | S | N | O | Mo | Ni | Cu | Nb | Ti | V | B | Ca | Mg | REM |
| AAAA | 0.06 | 0.52 | 1.8 | 0.010 | 0.008 | 0.001 | 0.003 | | | | | | | | | | |
| BBBB | 0.06 | 0.71 | 2.1 | 0.010 | 0.007 | 0.004 | 0.006 | | | | | | | | | | |
| CCCC | 0.06 | 0.62 | 2.5 | 0.021 | 0.004 | 0.006 | 0.003 | | | | | | | | | | |
| DDDD | 0.06 | 0.73 | 1.8 | 0.028 | 0.009 | 0.006 | 0.002 | | | | | | | | | | |
| EEEE | 0.06 | 0.51 | 2.2 | 0.028 | 0.006 | 0.002 | 0.001 | | | | | | | | | | |
| FFFF | 0.06 | 0.60 | 2.1 | 0.030 | 0.006 | 0.003 | 0.002 | | | | | | | | | | |

Next, of the hot-rolled steel sheets, pickling, cold rolling, and annealing were performed, and steel sheets were obtained. Conditions of the hot rolling, the cold rolling, and the annealing are illustrated in Table 5 to Table 7. The cooling rate of the condition of the annealing is an average cooling rate in a temperature zone of 700° C. to the Mf point. Of each of the steel sheets, an area fraction $f_F$ of ferrite, an area fraction $f_{GB}$ of granular bainite, an area fraction $f_M$ of martensite, and a total area fraction $f_T$ of upper bainite, lower bainite, tempered martensite, retained austenite, and pearlite are illustrated in Table 8 to Table 10. Each underline in Table 8 to Table 10 indicates that a corresponding numerical value is out of the range of the present invention.

TABLE 5

| SAMPLE No. | SYMBOL OF STEEL | HOT ROLLING | | | Ar3 POINT (° C.) | COLD ROLLING REDUCTION RATIO (%) | ANNEALING | | Mf POINT (° C.) |
| | | STARTING TEMPERATURE (° C.) | FINISHING TEMPERATURE (° C.) | COILING TEMPERATURE (° C.) | | | RETENTION TEMPERATURE (° C.) | COOLING RATE (° C./s) | |
|---|---|---|---|---|---|---|---|---|---|
| 1 | A | 1250 | 900 | 550 | 853 | 62 | 820 | 1.6 | 369 |
| 2 | B | 1250 | 900 | 550 | 812 | 62 | 820 | 2.6 | 352 |
| 3 | C | 1250 | 900 | 550 | 822 | 62 | 820 | 0.6 | 358 |
| 4 | D | 1250 | 900 | 550 | 816 | 62 | 820 | 0.7 | 332 |
| 5 | E | 1250 | 900 | 550 | 798 | 62 | 820 | 2.9 | 244 |
| 6 | F | 1250 | 900 | 550 | 800 | 62 | 820 | 2.3 | 361 |
| 7 | G | 1250 | 900 | 550 | 815 | 62 | 820 | 2.0 | 369 |
| 8 | H | 1250 | 900 | 550 | 884 | 62 | 820 | 3.5 | 360 |
| 9 | I | 1250 | 900 | 550 | 886 | 62 | 820 | 3.2 | 335 |
| 10 | J | 1250 | OCCURRENCE OF SLAB CRACKING | | | | | | | |
| 11 | K | 1250 | 900 | 550 | 884 | 62 | 820 | 3.0 | 427 |
| 12 | L | 1250 | 900 | 550 | 848 | 62 | 820 | 3.8 | 369 |
| 13 | M | 1250 | 900 | 550 | 819 | 62 | 820 | 2.9 | 352 |
| 14 | N | 1250 | 900 | 550 | 805 | 62 | 820 | 1.7 | 329 |
| 15 | O | 1250 | 900 | 550 | 791 | 62 | 820 | 3.4 | 300 |
| 16 | P | 1250 | 900 | 550 | 812 | 62 | 820 | 3.5 | 347 |
| 17 | Q | 1250 | 900 | 550 | 820 | 62 | 820 | 3.5 | 352 |
| 18 | R | 1250 | 900 | 550 | 834 | 62 | 820 | 3.5 | 366 |
| 19 | S | 1250 | 900 | 550 | 830 | 62 | 820 | 1.8 | 362 |
| 20 | TT | 1250 | 900 | 550 | 835 | 62 | 820 | 2.7 | 362 |
| 21 | U | 1250 | 900 | 550 | 820 | 62 | 820 | 3.2 | 367 |
| 22 | V | 1250 | 900 | 550 | 812 | 62 | 820 | 1.5 | 356 |
| 23 | W | 1250 | 900 | 550 | 810 | 62 | 820 | 1.6 | 346 |
| 24 | X | 1250 | 900 | 550 | 827 | 62 | 820 | 2.1 | 344 |
| 25 | Y | 1250 | 900 | 550 | 819 | 62 | 820 | 3.3 | 363 |
| 26 | Z | 1250 | 900 | 550 | 837 | 62 | 820 | 2.8 | 349 |

TABLE 6

| SAMPLE No. | SYMBOL OF STEEL | HOT ROLLING | | | Ar3 POINT (° C.) | COLD ROLLING REDUCTION RATIO (%) | ANNEALING | | Mf POINT (° C.) |
| | | STARTING TEMPERATURE (° C.) | FINISHING TEMPERATURE (° C.) | COILING TEMPERATURE (° C.) | | | RETENTION TEMPERATURE (° C.) | COOLING RATE (° C./s) | |
|---|---|---|---|---|---|---|---|---|---|
| 27 | AA | 1250 | 900 | 550 | 811 | 62 | 820 | 2.3 | 318 |
| 28 | BB | 1250 | 900 | 550 | 835 | 62 | 820 | 3.6 | 306 |
| 29 | CC | 1250 | 900 | 550 | 826 | 62 | 820 | 2.9 | 366 |
| 30 | DD | 1250 | 900 | 550 | 824 | 62 | 820 | 0.9 | 352 |
| 31 | EE | 1250 | 900 | 550 | 821 | 62 | 820 | 3.6 | 317 |
| 32 | FF | 1250 | 900 | 550 | 813 | 62 | 820 | 0.8 | 342 |
| 33 | GG | 1250 | 900 | 550 | 812 | 62 | 820 | 1.1 | 335 |
| 34 | HH | 1250 | 900 | 550 | 810 | 62 | 820 | 2.8 | 324 |
| 35 | II | 1250 | 900 | 550 | 825 | 62 | 820 | 3.8 | 352 |
| 36 | JJ | 1250 | 900 | 550 | 813 | 62 | 820 | 2.4 | 350 |
| 37 | KK | 1250 | 900 | 550 | 817 | 62 | 820 | 3.7 | 350 |
| 38 | LL | 1250 | 900 | 550 | 816 | 62 | 820 | 3.1 | 347 |
| 39 | MM | 1250 | 900 | 550 | 816 | 62 | 820 | 2.0 | 354 |
| 40 | NN | 1250 | 900 | 550 | 822 | 62 | 820 | 3.2 | 354 |
| 41 | OO | 1250 | 900 | 550 | 824 | 62 | 820 | 2.8 | 357 |
| 42 | PP | 1250 | 900 | 550 | 806 | 62 | 820 | 2.8 | 344 |
| 43 | QQ | 1250 | 900 | 550 | 827 | 62 | 820 | 1.7 | 364 |
| 44 | RR | 1250 | 900 | 550 | 832 | 62 | 820 | 1.5 | 364 |
| 45 | SS | 1250 | 900 | 550 | 823 | 62 | 820 | 1.4 | 351 |
| 46 | TT | 1250 | 900 | 550 | 807 | 62 | 820 | 1.4 | 326 |
| 47 | UU | 1250 | 900 | 550 | 818 | 62 | 820 | 3.6 | 356 |
| 48 | VV | 1250 | 900 | 550 | 836 | 62 | 820 | 3.5 | 367 |
| 49 | WW | 1250 | 900 | 550 | 833 | 62 | 820 | 1.8 | 365 |
| 50 | XX | 1250 | 900 | 550 | 827 | 62 | 820 | 3.9 | 365 |
| 51 | YY | 1250 | 900 | 550 | 825 | 62 | 820 | 3.9 | 354 |
| 52 | ZZ | 1250 | 900 | 550 | 820 | 62 | 820 | 2.7 | 356 |

TABLE 7

| SAMPLE No. | SYMBOL OF STEEL | HOT ROLLING | | | Ar3 POINT (° C.) | COLD ROLLING REDUCTION RATIO (%) | ANNEALING | | Mf POINT (° C.) |
| | | STARTING TEMPERATURE (° C.) | FINISHING TEMPERATURE (° C.) | COILING TEMPERATURE (° C.) | | | RETENTION TEMPERATURE (° C.) | COOLING RATE (° C./s) | |
| --- | --- | --- | --- | --- | --- | --- | --- | --- | --- |
| 53 | AAA | 1250 | 900 | 550 | 816 | 62 | 820 | 0.5 | 350 |
| 54 | BBB | 1250 | 900 | 550 | 827 | 62 | 820 | 3.1 | 364 |
| 55 | CCC | 1250 | 900 | 550 | 812 | 62 | 820 | 3.5 | 350 |
| 56 | DOD | 1250 | 900 | 550 | 826 | 62 | 820 | 3.0 | 354 |
| 57 | EEE | 1250 | 900 | 550 | 812 | 62 | 820 | 0.6 | 345 |
| 58 | FFF | 1250 | 900 | 550 | 828 | 62 | 820 | 2.8 | 358 |
| 59 | GGG | 1250 | 900 | 750 | 807 | 62 | 820 | 0.8 | 336 |
| 60 | HHH | 1250 | 900 | 550 | 828 | 59 | 820 | 4.0 | 356 |
| 61 | III | 1250 | 900 | 550 | 810 | 75 | 820 | 3.4 | 341 |
| 62 | JJJ | 1250 | 900 | 550 | 817 | 62 | 650 | 2.8 | 357 |
| 63 | KKK | 1250 | 900 | 550 | 830 | 62 | 820 | 3.9 | 358 |
| 64 | LLL | 1250 | 900 | 550 | 815 | 62 | 950 | 2.2 | 319 |
| 65 | MMM | 1250 | 900 | 550 | 812 | 62 | 820 | 1.9 | 364 |
| 66 | NNN | 1250 | 900 | 550 | 834 | 62 | 820 | 3.4 | 337 |
| 67 | OOO | 1250 | 900 | 550 | 808 | 62 | 820 | 2.7 | 357 |
| 68 | PPP | 1250 | 900 | 550 | 827 | 62 | 820 | 3.6 | 350 |
| 69 | QQQ | 1250 | 900 | 550 | 824 | 62 | 820 | 1.2 | 348 |
| 70 | RRR | 1250 | 900 | 550 | 813 | 62 | 820 | 4.0 | 351 |
| 71 | SSS | 1250 | 900 | 550 | 813 | 62 | 820 | 3.9 | 354 |
| 72 | TTT | 1250 | 900 | 550 | 821 | 62 | 820 | 4.0 | 344 |
| 73 | UUU | 1250 | 900 | 550 | 809 | 62 | 820 | 1.6 | 363 |
| 74 | VVV | 1250 | 900 | 550 | 825 | 62 | 820 | 3.4 | 350 |
| 75 | WWW | 1250 | 900 | 550 | 822 | 62 | 820 | 3.3 | 342 |
| 76 | XXX | 1250 | 900 | 550 | 810 | 62 | 820 | 3.0 | 346 |
| 77 | YYY | 1250 | 900 | 550 | 816 | 62 | 820 | 3.0 | 357 |
| 78 | ZZZ | 1250 | 900 | 550 | 826 | 62 | 820 | 2.0 | 342 |
| 79 | AAAA | 1250 | 900 | 550 | 828 | 62 | 820 | 5.9 | 369 |
| 80 | BBBB | 1250 | 900 | 550 | 828 | 62 | 820 | 3.3 | 356 |
| 81 | CCCC | 1250 | 900 | 550 | 811 | 62 | 820 | 1.8 | 342 |
| 82 | DDDD | 1250 | 900 | 550 | 838 | 62 | 820 | 1.6 | 368 |
| 83 | EEEE | 1250 | 900 | 550 | 816 | 62 | 820 | 2.5 | 355 |

TABLE 8

| SAMPLE No. | SYMBOL OF STEEL | METAL STRUCTURE | | | | NOTE |
| | | $f_F$ (%) | $f_{GB}$ (%) | $f_M$ (%) | $f_T$ (%) | |
| --- | --- | --- | --- | --- | --- | --- |
| 1 | <u>A</u> | <u>98</u> | <u>0</u> | 2 | 0 | COMPARATIVE EXAMPLE |
| 2 | B | 88 | 8 | 4 | 0 | EXAMPLE |
| 3 | C | 75 | 7 | 17 | 1 | EXAMPLE |
| 4 | D | 54 | 13 | 29 | 4 | EXAMPLE |
| 5 | <u>E</u> | <u>20</u> | 5 | <u>54</u> | <u>21</u> | COMPARATIVE EXAMPLE |
| 6 | <u>F</u> | 76 | <u>2</u> | <u>1</u> | <u>21</u> | COMPARATIVE EXAMPLE |
| 7 | G | 82 | 5 | 4 | <u>9</u> | EXAMPLE |
| 8 | H | 75 | 7 | 17 | 1 | EXAMPLE |
| 9 | I | 55 | 16 | 29 | 0 | EXAMPLE |
| 10 | <u>J</u> | OCCURRENCE OF SLAB CRACKING | | | | COMPARATIVE EXAMPLE |
| 11 | <u>K</u> | <u>99</u> | <u>1</u> | <u>0</u> | 0 | COMPARATIVE EXAMPLE |
| 12 | L | 86 | 8 | 4 | 2 | EXAMPLE |
| 13 | M | 72 | 11 | 17 | 0 | EXAMPLE |
| 14 | N | 52 | 16 | 28 | 4 | EXAMPLE |
| 15 | <u>O</u> | <u>36</u> | 7 | 45 | <u>12</u> | COMPARATIVE EXAMPLE |
| 16 | P | 72 | 10 | 17 | 1 | EXAMPLE |
| 17 | Q | 73 | 10 | 17 | 0 | EXAMPLE |
| 18 | <u>R</u> | 72 | 10 | 16 | 2 | COMPARATIVE EXAMPLE |
| 19 | S | 74 | 11 | 15 | 0 | EXAMPLE |
| 20 | T | 78 | 10 | 12 | 0 | EXAMPLE |
| 21 | <u>U</u> | 76 | 10 | 12 | 2 | COMPARATIVE EXAMPLE |
| 22 | V | 74 | 11 | 15 | 0 | EXAMPLE |
| 23 | <u>W</u> | 75 | 10 | 14 | 1 | COMPARATIVE EXAMPLE |
| 24 | X | 73 | 10 | 14 | 3 | EXAMPLE |
| 25 | <u>Y</u> | 72 | 10 | 15 | 3 | COMPARATIVE EXAMPLE |
| 26 | Z | 72 | 10 | 15 | 3 | EXAMPLE |

TABLE 9

| SAMPLE No. | SYMBOL OF STEEL | METAL STRUCTURE $f_F$ (%) | $f_{GB}$ (%) | $f_M$ (%) | $f_T$ (%) | NOTE |
|---|---|---|---|---|---|---|
| 27 | AA | 52 | 18 | 29 | 1 | EXAMPLE |
| 28 | BB | 20 | 12 | 52 | 16 | COMPARATIVE EXAMPLE |
| 29 | CC | 85 | 13 | 2 | 0 | EXAMPLE |
| 30 | DD | 52 | 17 | 28 | 3 | EXAMPLE |
| 31 | EE | 25 | 10 | 60 | 5 | COMPARATIVE EXAMPLE |
| 32 | FF | 84 | 8 | 8 | 0 | EXAMPLE |
| 33 | GG | 52 | 6 | 40 | 2 | EXAMPLE |
| 34 | HH | 34 | 8 | 45 | 13 | COMPARATIVE EXAMPLE |
| 35 | II | 72 | 5 | 14 | 9 | EXAMPLE |
| 36 | JJ | 82 | 6 | 12 | 0 | EXAMPLE |
| 37 | KK | 98 | 0 | 0 | 2 | COMPARATIVE EXAMPLE |
| 38 | LL | 72 | 6 | 12 | 10 | COMPARATIVE EXAMPLE |
| 39 | MM | 83 | 8 | 8 | 1 | EXAMPLE |
| 40 | NN | 99 | 0 | 0 | 1 | COMPARATIVE EXAMPLE |
| 41 | OO | 74 | 5 | 17 | 4 | EXAMPLE |
| 42 | PP | 80 | 6 | 10 | 4 | EXAMPLE |
| 43 | QQ | 97 | 0 | 0 | 3 | COMPARATIVE EXAMPLE |
| 44 | RR | 74 | 6 | 15 | 5 | EXAMPLE |
| 45 | SS | 58 | 10 | 28 | 4 | EXAMPLE |
| 46 | TT | 44 | 6 | 40 | 10 | COMPARATIVE EXAMPLE |
| 47 | UU | 74 | 10 | 12 | 4 | EXAMPLE |
| 48 | VV | 75 | 10 | 12 | 3 | EXAMPLE |
| 49 | WW | 74 | 10 | 12 | 4 | COMPARATIVE EXAMPLE |
| 50 | XX | 74 | 10 | 12 | 4 | EXAMPLE |
| 51 | YY | 75 | 10 | 12 | 3 | EXAMPLE |
| 52 | ZZ | 74 | 5 | 12 | 10 | COMPARATIVE EXAMPLE |

TABLE 10

| SAMPLE No. | SYMBOL OF STEEL | METAL STRUCTURE $f_F$ (%) | $f_{GB}$ (%) | $f_M$ (%) | $f_T$ (%) | NOTE |
|---|---|---|---|---|---|---|
| 53 | AAA | 74 | 10 | 12 | 4 | EXAMPLE |
| 54 | BBB | 75 | 10 | 12 | 3 | EXAMPLE |
| 55 | CCC | 74 | 5 | 12 | 9 | COMPARATIVE EXAMPLE |
| 56 | DDD | 74 | 6 | 20 | 0 | EXAMPLE |
| 57 | EEE | 74 | 6 | 20 | 0 | EXAMPLE |
| 58 | FFF | 74 | 6 | 20 | 0 | EXAMPLE |
| 59 | GGG | 56 | 6 | 20 | 18 | COMPARATIVE EXAMPLE |
| 60 | HHH | 74 | 6 | 20 | 0 | EXAMPLE |
| 61 | III | 70 | 13 | 17 | 0 | EXAMPLE |
| 62 | JJJ | 82 | 0 | 1 | 17 | COMPARATIVE EXAMPLE |
| 63 | KKK | 74 | 6 | 20 | 0 | EXAMPLE |
| 64 | LLL | 10 | 6 | 50 | 34 | COMPARATIVE EXAMPLE |
| 65 | MMM | 74 | 6 | 20 | 0 | EXAMPLE |
| 66 | NNN | 74 | 6 | 20 | 0 | EXAMPLE |
| 67 | OOO | 74 | 1 | 10 | 15 | COMPARATIVE EXAMPLE |
| 68 | PPP | 74 | 8 | 18 | 0 | EXAMPLE |
| 69 | QQQ | 74 | 2 | 20 | 4 | COMPARATIVE EXAMPLE |
| 70 | RRR | 74 | 1 | 10 | 15 | COMPARATIVE EXAMPLE |
| 71 | SSS | 74 | 9 | 17 | 0 | EXAMPLE |
| 72 | TTT | 74 | 1 | 8 | 17 | COMPARATIVE EXAMPLE |
| 73 | UUU | 74 | 9 | 17 | 0 | EXAMPLE |
| 74 | VVV | 74 | 2 | 20 | 4 | COMPARATIVE EXAMPLE |
| 75 | WWW | 78 | 2 | 20 | 0 | COMPARATIVE EXAMPLE |
| 76 | XXX | 74 | 8 | 17 | 1 | EXAMPLE |
| 77 | YYY | 74 | 1 | 8 | 17 | COMPARATIVE EXAMPLE |
| 78 | ZZZ | 74 | 9 | 17 | 0 | EXAMPLE |
| 79 | AAAA | 74 | 1 | 9 | 16 | COMPARATIVE EXAMPLE |
| 80 | BBBB | 74 | 1 | 17 | 8 | COMPARATIVE EXAMPLE |
| 81 | CCCC | 74 | 9 | 17 | 0 | EXAMPLE |
| 82 | DDDD | 74 | 9 | 15 | 2 | EXAMPLE |
| 83 | EEEE | 74 | 9 | 13 | 4 | EXAMPLE |

Then, a tensile test and a hole expansion test of each of the steel sheets were performed. In the tensile test, a Japan Industrial Standard JIS No. 5 test piece was taken perpendicularly to the rolling direction from the steel sheet, of which a tensile strength TS and total elongation EL were measured in conformity with JISZ2242. In the hole expansion test, a hole expansion ratio λ was measured in accordance with the description of JISZ2256. These results are illustrated in Table 11 to Table 13. Each underline in Table 11 to Table 13 indicates that a corresponding numerical value is out of a desired range. The desired range to be described here means that TS is 590 MPa or more, TS×EL is 15000 MPa·% or more, and TS×λ is 25000 MPa·% or more.

TABLE 11

| SAMPLE No. | SYMBOL OF STEEL | MECHANICAL PROPERTIES | | | | | NOTE |
|---|---|---|---|---|---|---|---|
| | | TS (MPa) | EL (%) | λ (%) | TS × EL (MPa · %) | TS × λ (MPa · %) | |
| 1 | A | 490 | 37 | 85 | 18261 | 41681 | COMPARATIVE EXAMPLE |
| 2 | B | 593 | 33 | 58 | 19844 | 34418 | EXAMPLE |
| 3 | C | 680 | 29 | 40 | 19389 | 27213 | EXAMPLE |
| 4 | D | 812 | 20 | 32 | 16039 | 25975 | EXAMPLE |
| 5 | E | 1075 | 8 | 20 | 8167 | 21491 | COMPARATIVE EXAMPLE |
| 6 | F | 663 | 29 | 35 | 19156 | 23215 | COMPARATIVE EXAMPLE |
| 7 | G | 659 | 31 | 58 | 20533 | 38219 | EXAMPLE |
| 8 | H | 703 | 29 | 40 | 20046 | 28134 | EXAMPLE |
| 9 | I | 821 | 21 | 31 | 17034 | 25451 | EXAMPLE |
| 10 | J | OCCURRENCE OF SLAB CRACKING | | | | | COMPARATIVE EXAMPLE |
| 11 | K | 482 | 38 | 89 | 18118 | 42862 | COMPARATIVE EXAMPLE |
| 12 | L | 622 | 33 | 58 | 20317 | 36058 | EXAMPLE |
| 13 | M | 721 | 27 | 40 | 19713 | 28820 | EXAMPLE |
| 14 | N | 816 | 20 | 33 | 15881 | 26928 | EXAMPLE |
| 15 | O | 870 | 14 | 27 | 11902 | 23490 | COMPARATIVE EXAMPLE |
| 16 | P | 708 | 27 | 41 | 19363 | 29016 | EXAMPLE |
| 17 | Q | 705 | 28 | 38 | 19559 | 26793 | EXAMPLE |
| 18 | R | 707 | 27 | 18 | 19337 | 12722 | COMPARATIVE EXAMPLE |
| 19 | S | 681 | 28 | 41 | 19159 | 27935 | EXAMPLE |
| 20 | T | 670 | 30 | 39 | 19846 | 26113 | EXAMPLE |
| 21 | U | 669 | 29 | 18 | 19313 | 12037 | COMPARATIVE EXAMPLE |
| 22 | V | 683 | 28 | 38 | 19213 | 25964 | EXAMPLE |
| 23 | W | 677 | 29 | 27 | 19289 | 18274 | COMPARATIVE EXAMPLE |
| 24 | X | 680 | 28 | 37 | 18867 | 25165 | EXAMPLE |
| 25 | Y | 695 | 27 | 28 | 19013 | 19458 | COMPARATIVE EXAMPLE |
| 26 | Z | 703 | 27 | 38 | 19223 | 26698 | EXAMPLE |

TABLE 12

| SAMPLE No. | SYMBOL OF STEEL | MECHANICAL PROPERTIES | | | | | NOTE |
|---|---|---|---|---|---|---|---|
| | | TS (MPa) | EL (%) | λ (%) | TS × EL (MPa · %) | TS × λ (MPa · %) | |
| 27 | AA | 793 | 20 | 34 | 15679 | 26978 | EXAMPLE |
| 28 | BB | 932 | 8 | 29 | 7087 | 27042 | COMPARATIVE EXAMPLE |
| 29 | CC | 654 | 32 | 41 | 21137 | 26830 | EXAMPLE |
| 30 | DD | 797 | 20 | 38 | 15755 | 30298 | EXAMPLE |
| 31 | EE | 945 | 10 | 34 | 8977 | 32129 | COMPARATIVE EXAMPLE |
| 32 | FF | 647 | 32 | 41 | 20645 | 26518 | EXAMPLE |
| 33 | GG | 810 | 20 | 34 | 16008 | 27544 | EXAMPLE |
| 34 | HH | 875 | 13 | 24 | 11300 | 20991 | COMPARATIVE EXAMPLE |
| 35 | II | 730 | 27 | 37 | 19451 | 27010 | EXAMPLE |
| 36 | JJ | 664 | 31 | 38 | 20497 | 25232 | EXAMPLE |
| 37 | KK | 484 | 37 | 51 | 18042 | 24708 | COMPARATIVE EXAMPLE |
| 38 | LL | 703 | 27 | 43 | 19240 | 30239 | EXAMPLE |
| 39 | MM | 680 | 32 | 45 | 21451 | 30606 | EXAMPLE |
| 40 | NN | 482 | 38 | 50 | 18142 | 24112 | COMPARATIVE EXAMPLE |
| 41 | OO | 692 | 28 | 42 | 19465 | 29073 | EXAMPLE |
| 42 | PP | 668 | 30 | 45 | 20293 | 30038 | EXAMPLE |
| 43 | QQ | 487 | 37 | 56 | 17940 | 27256 | COMPARATIVE EXAMPLE |
| 44 | RR | 715 | 28 | 37 | 20113 | 26465 | EXAMPLE |
| 45 | SS | 794 | 21 | 32 | 16907 | 25424 | EXAMPLE |
| 46 | TT | 825 | 17 | 24 | 13800 | 19808 | COMPARATIVE EXAMPLE |
| 47 | UU | 693 | 28 | 40 | 19483 | 27715 | EXAMPLE |
| 48 | VV | 721 | 29 | 35 | 20547 | 25234 | EXAMPLE |
| 49 | WW | 718 | 28 | 21 | 20185 | 15074 | COMPARATIVE EXAMPLE |
| 50 | XX | 693 | 28 | 42 | 19483 | 29100 | EXAMPLE |
| 51 | YY | 721 | 29 | 35 | 20547 | 25234 | EXAMPLE |
| 52 | ZZ | 718 | 28 | 20 | 20185 | 14356 | COMPARATIVE EXAMPLE |

TABLE 13

| SAMPLE No. | SYMBOL OF STEEL | MECHANICAL PROPERTIES | | | | | NOTE |
|---|---|---|---|---|---|---|---|
| | | TS (MPa) | EL (%) | λ (%) | TS × EL (MPa · %) | TS × λ (MPa · %) | |
| 53 | AAA | 693 | 28 | 42 | 19483 | 29100 | EXAMPLE |
| 54 | BBB | 721 | 29 | 35 | 20547 | 25234 | EXAMPLE |
| 55 | CCC | 718 | 28 | 21 | 20185 | 15074 | COMPARATIVE EXAMPLE |
| 56 | DDD | 672 | 28 | 38 | 18907 | 25551 | EXAMPLE |
| 57 | EEE | 672 | 28 | 38 | 18907 | 25551 | EXAMPLE |
| 58 | FFF | 672 | 28 | 38 | 18907 | 25551 | EXAMPLE |
| 59 | GGG | 720 | 21 | 32 | 15313 | 23028 | COMPARATIVE EXAMPLE |
| 60 | HHH | 672 | 28 | 39 | 18907 | 26223 | EXAMPLE |
| 61 | III | 657 | 30 | 39 | 19962 | 25609 | EXAMPLE |
| 62 | JJJ | 606 | 31 | 32 | 18891 | 19401 | COMPARATIVE EXAMPLE |
| 63 | KKK | 672 | 28 | 40 | 18907 | 26895 | EXAMPLE |
| 64 | LLL | 917 | 4 | 35 | 3485 | 32099 | COMPARATIVE EXAMPLE |
| 65 | MMM | 672 | 28 | 41 | 18907 | 27568 | EXAMPLE |
| 66 | NNN | 672 | 28 | 38 | 18907 | 25551 | EXAMPLE |
| 67 | OOO | 650 | 28 | 32 | 18278 | 20799 | COMPARATIVE EXAMPLE |
| 68 | PPP | 666 | 28 | 38 | 18727 | 25307 | EXAMPLE |
| 69 | QQQ | 675 | 28 | 30 | 18979 | 20248 | COMPARATIVE EXAMPLE |
| 70 | RRR | 650 | 28 | 28 | 18278 | 18200 | COMPARATIVE EXAMPLE |
| 71 | SSS | 663 | 28 | 39 | 18637 | 25849 | EXAMPLE |
| 72 | TTT | 645 | 28 | 25 | 18134 | 16122 | COMPARATIVE EXAMPLE |
| 73 | UUU | 663 | 28 | 40 | 18637 | 26511 | EXAMPLE |
| 74 | VVV | 675 | 28 | 18 | 18979 | 12149 | COMPARATIVE EXAMPLE |
| 75 | WWW | 664 | 30 | 20 | 19694 | 13289 | COMPARATIVE EXAMPLE |
| 76 | XXX | 663 | 28 | 42 | 18655 | 27864 | EXAMPLE |
| 77 | YYY | 645 | 28 | 35 | 18134 | 22570 | COMPARATIVE EXAMPLE |
| 78 | ZZZ | 663 | 28 | 38 | 18637 | 25186 | EXAMPLE |
| 79 | AAAA | 647 | 28 | 32 | 18206 | 20718 | COMPARATIVE EXAMPLE |
| 80 | BBBB | 668 | 28 | 34 | 18781 | 22709 | COMPARATIVE EXAMPLE |
| 81 | CCCC | 663 | 28 | 41 | 18637 | 27174 | EXAMPLE |
| 82 | DDDD | 658 | 28 | 42 | 18494 | 27622 | EXAMPLE |
| 83 | EEEE | 653 | 28 | 40 | 18350 | 26102 | EXAMPLE |

As illustrated in Table 11 to Table 13, it was possible to obtain a high strength and excellent elongation and hole expandability in each of samples falling within the present invention range.

In Sample No. 1, the C content was too low, and thus the strength was low. In Sample No. 5, the C content was too high, and thus the elongation and the hole expandability were low. In Sample No. 6, the total content of Si and Al was too low, and thus the hole expandability was low. In Sample No. 10, the total content of Si and Al was too high, and thus slab cracking occurred during hot rolling. In Sample No. 11, the total content of Mn and Cr was too low, and thus the strength was low. In Sample No. 15, the total content of Mn and Cr was too high, and thus the elongation and the hole expandability were low. In Sample No. 18, the P content was too high, and thus the hole expandability was low. In Sample No. 21, the S content was too high, and thus the hole expandability was low. In Sample No. 23, the N content was too high, and thus the hole expandability was low. In Sample No. 25, the O content was too high, and thus the hole expandability was low.

In Sample No. 28, the Mo content was too high, and thus the elongation was low. In Sample No. 31, the Ni content was too high, and thus the elongation was low. In Sample No. 34, the Cu content was too high, and thus the elongation and the hole expandability were low. In Sample No. 37, the Nb content was too high, and thus the strength was low and the hole expandability was low. In Sample No. 40, the Ti content was too high, and thus the strength was low and the hole expandability was low. In Sample No. 43, the V content was too high, and thus the strength was low. In Sample No. 46, the B content was too high, and thus the elongation and the hole expandability were low. In Sample No. 49, the Ca content was too high, and thus the hole expandability was low. In Sample No. 52, the Mg content was too high, and thus the hole expandability was low. In Sample No. 55, the REM content was too high, and thus the hole expandability was low.

In Sample No. 59, the total area fraction $f_T$ was too high, and thus the hole expandability was low. In Sample No. 62, the area fraction $f_M$ was too low and the total area fraction $f_T$ was too high, and thus the hole expandability was low. In Sample No. 64, the area fraction $f_F$ was too low and the total area fraction $f_T$ was too high, and thus the elongation was low. In Sample No. 67, the area fraction $f_{GB}$ was too low and the total area fraction $f_T$ was too high, and thus the hole expandability was low. In Sample No. 69, the area fraction $f_{GB}$ was too low, and thus the hole expandability was low. In Sample No. 70, the area fraction $f_{GB}$ was too low and the total area fraction $f_T$ was too high, and thus the hole expandability was low. In Sample No. 72, the area fraction $f_{GB}$ was too low and the total area fraction $f_T$ was too high, and thus the hole expandability was low. In Sample No. 74, the area fraction $f_{GB}$ was too low, and thus the hole expandability was low. In Sample No. 75, the area fraction $f_{GB}$ was too low, and thus the hole expandability was low. In Sample No. 77, the area fraction $f_{GB}$ was too low and the total area fraction $f_T$ was too high, and thus the hole expandability was low. In Sample No. 79, the area fraction $f_{GB}$ was too low and the total area fraction $f_T$ was too high, and thus the hole expandability was low. In Sample No. 80, the area fraction $f_{GB}$ was too low and the total area fraction $f_T$ was too high, and thus the hole expandability was low.

INDUSTRIAL APPLICABILITY

The present invention can be utilized in, for example, industries relating to a steel sheet suitable for automotive parts.

The invention claimed is:
1. A steel sheet, comprising:
a chemical composition represented by, in mass %,
C: 0.05% to 0.1%,
P: 0.04% or less,
S: 0.01% or less,
N: 0.01% or less,
O: 0.006% or less,
Si and Al: 0.20% to 2.50% in total,
Mn and Cr: 1.0% to 3.0% in total,
Mo: 0.00% to 1.00%,
Ni: 0.00% to 1.00%,
Cu: 0.00% to 1.00%,
Nb: 0.000% to 0.30%,
Ti: 0.000% to 0.30%,
V: 0.000% to 0.50%,
B: 0.0000% to 0.01%,
Ca: 0.0000% to 0.04%,
Mg: 0.0000% to 0.04%,
REM: 0.0000% to 0.04%, and
the balance: Fe and impurities; and
a metal structure represented by, in area fraction,
ferrite: 52% to 93%,
granular bainite: 5% to 48%,
martensite: 5% to 30%, and
upper bainite, lower bainite, tempered martensite, retained austenite, and pearlite: 5% or less in total.

2. The steel sheet according to claim 1, wherein at least one of Mo, Ni or Cu is present in the chemical composition, and wherein the chemical composition comprises, in mass %:
Mo: 0.01% to 1.00%, and/or
Ni: 0.05% to 1.00%, and/or
Cu: 0.05% to 1.00%.

3. The steel sheet according to claim 1, wherein at least one of Nb, Ti or V is present in the chemical composition, and wherein the chemical composition comprises, in mass %:
Nb: 0.005% to 0.30%, and/or
Ti: 0.005% to 0.30%, and/or
V: 0.005% to 0.50%.

4. The steel sheet according to claim 1, wherein
in the chemical composition, in mass %,
B: 0.0001% to 0.01% is established.

5. The steel sheet according to claim 1, wherein at least one of Ca, Mg or REM is present in the chemical composition, and wherein the chemical composition comprises, in mass %:
Ca: 0.0005% to 0.04%, and/or
Mg: 0.0005% to 0.04%, and/or
REM: 0.0005% to 0.04%.

6. The steel sheet according to claim 1, further comprising:
a hot-dip galvanizing layer on a surface thereof.

7. The steel sheet according to claim 1, further comprising:
an alloyed hot-dip galvanizing layer on a surface thereof.

8. The steel sheet according to claim 1, wherein a tensile strength is 590 MPa or more.

* * * * *